(12) United States Patent
Kumar et al.

(10) Patent No.: US 9,914,897 B2
(45) Date of Patent: Mar. 13, 2018

(54) SUBCRITICAL WATER ASSISTED OIL EXTRACTION AND GREEN COAL PRODUCTION FROM OILSEEDS

(71) Applicant: Tyton Biosciences, LLC, Danville, VA (US)

(72) Inventors: Sandeep Kumar, Norfolk, VA (US); Peter J. Majeranowski, Norfolk, VA (US)

(73) Assignee: Tyton Biosciences, LLC, Danville, VA (US)

( * ) Notice: Subject to any disclaimer, the term of this patent is extended or adjusted under 35 U.S.C. 154(b) by 0 days.

(21) Appl. No.: 15/595,133

(22) Filed: May 15, 2017

(65) Prior Publication Data

US 2017/0253829 A1 Sep. 7, 2017

Related U.S. Application Data

(63) Continuation-in-part of application No. 15/140,866, filed on Apr. 28, 2016, which is a continuation of application No. 14/437,846, filed as application No. PCT/US2013/064966 on Oct. 15, 2013, now Pat. No. 9,328,312.

(60) Provisional application No. 61/717,219, filed on Oct. 23, 2012.

(51) Int. Cl.
| C11B 1/10 | (2006.01) |
| C11B 1/04 | (2006.01) |
| C10L 5/44 | (2006.01) |
| A23J 1/14 | (2006.01) |
| C11B 1/02 | (2006.01) |
| C11B 1/08 | (2006.01) |
| C11B 3/00 | (2006.01) |
| C11C 3/00 | (2006.01) |

(52) U.S. Cl.
CPC .............. *C11B 1/104* (2013.01); *A23J 1/14* (2013.01); *C10L 5/44* (2013.01); *C11B 1/02* (2013.01); *C11B 1/04* (2013.01); *C11B 1/08* (2013.01); *C11B 1/10* (2013.01); *C11B 3/00* (2013.01); *C11C 3/003* (2013.01); *C10L 2200/0484* (2013.01); *C10L 2290/544* (2013.01); *Y02E 50/10* (2013.01); *Y02E 50/30* (2013.01)

(58) Field of Classification Search
CPC ........................................................ C11B 1/104
USPC ........................................................... 554/15
See application file for complete search history.

(56) References Cited

U.S. PATENT DOCUMENTS

2013/0206571 A1* 8/2013 Heilmann ............ B01D 9/0013
201/3

* cited by examiner

*Primary Examiner* — Deborah D Carr
(74) *Attorney, Agent, or Firm* — NK Patent Law, PLLC

(57) ABSTRACT

Provided herein are methods of optimizing energy recovery from oilseeds. The methods disclosed provide at least the ability to swell oilseeds and disrupt the cell walls (hulls) without changing the functionality and quality of oil; the process integration of removing the impurities from oilseeds, oil extraction, protein hydrolysis, and green coal production to maximize the energy recovery in the form of crude oil, polypeptides, oligopeptides, amino acids, and/or green coal from oilseeds; and heat integration during processing stages including subcritical water pretreatment, oil extraction, subcritical water post-treatment, and subcritical water carbonization to minimize the process heat requirement.

17 Claims, 6 Drawing Sheets

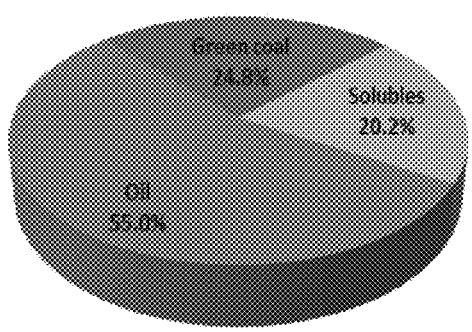
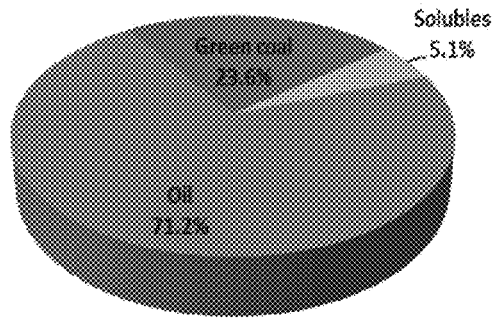
FIG. 9A
FIG. 9B
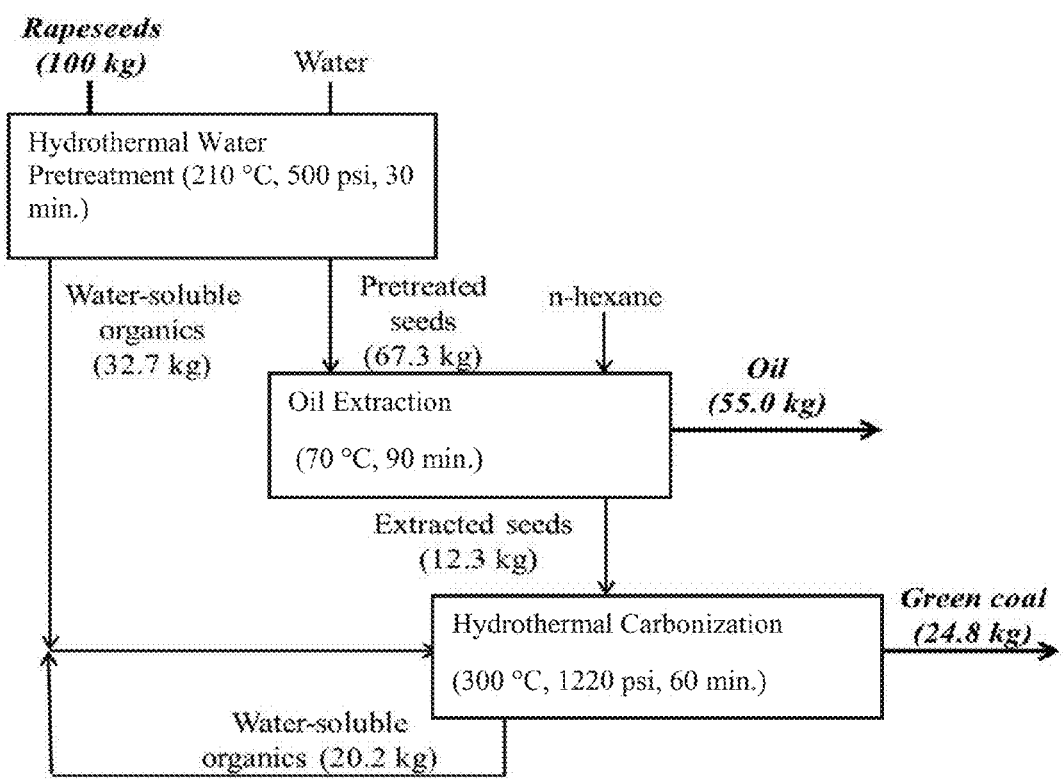
FIG. 10

SUBCRITICAL WATER ASSISTED OIL EXTRACTION AND GREEN COAL PRODUCTION FROM OILSEEDS

CROSS REFERENCE TO RELATED APPLICATION

This application is a continuation-in-part of U.S. patent application Ser. No. 15/140,866, filed Apr. 28, 2016, which is a continuation of U.S. patent application Ser. No. 14/437, 846, filed Apr. 23, 2015, which is a 35 U.S.C. 371 national stage of International Patent Application No. PCT/US2013/064966 filed on Oct. 15, 2013, claiming priority to U.S. Provisional Patent Application Ser. No. 61/717,219 filed on Oct. 23, 2012, all incorporated herein by reference in their entireties.

BACKGROUND

Oilseeds are grains that are valuable for the oil content they produce. Some of these oilseeds include (but are not limited to) cotton seeds, rapeseeds, mustard, sunflower, safflower, tobacco seeds, sesame soybeans, cotton seed, flaxseed, and canola seed. The oil content in these seeds depends on the type of plants, but it is common to get 15-50 weight % of oil in the total seed mass. Table 1 shows the oil content in some common seeds on a dry basis:

TABLE 1

| Seeds | Moisture content (wt %) | Oil/Fat content (wt %) |
|---|---|---|
| Cotton | 5 | 15-25 |
| Rape | 9 | 40-45 |
| Mustard | 7 | 25-45 |
| Sesame | 5 | 25-50 |
| Sunflower | 5 | 25-50 |
| Safflower | 5 | 25-30 |
| Tobacco | 7 | 35-45 |

Oilseeds are used chiefly to produce vegetable oil and oilseed meal, which in turn are used to produce food fats and oil products, as well as animal feed for poultry, hogs, and cattle. Other applications are in soap-making, cosmetics, detergents, or as an ingredient in other foods.

Recently, non-food based oils (e.g., tobacco seeds, cotton seeds) have been envisioned as a renewable feedstock for producing biodiesel or other alternative fuels. The procedures to extract oil from seeds are generally solvent extraction and pressing. At commercial scales, the seeds are subjected to a number of processing steps prior to oil extraction. The oilseed is first cleaned to remove trash, dirt, and sand before subjecting the oilseeds to mechanical extraction such as pressing or solvent extraction process. The conventional method of pressing the seeds leaves too much high value oil in the seed cakes. Therefore, solvent extraction methods are used to maximize the oil extracted.

Solvent extraction achieves more complete oil recovery than mechanical extraction but requires a thorough preparation of the feedstock (e.g. drying, cleaning, dehulling, conditioning, flaking, cooking/tempering, pre-pressing, etc.) Solvent extraction removes the oil from a flaked seed or oil-cake by treating the flaked seed or oil-cake with non-polar solvents such as hexane. FIGS. 1A and 1B illustrate the major steps involved in oil extraction using pressing and solvent extraction. These processes are generally expensive and have some well-known challenges, such as additional seed preparation stages, use of dry seeds, primer pressing, steam cooking to facilitate the solvent extraction process, long extraction time, loss of volatile compounds, and the generation of large amount of toxic solvent/chemical waste. Accordingly, improved processes are desired.

SUMMARY

In some embodiments, disclosed herein are processes for optimizing energy recovery from an oilseed. Energy recovery is optimized by producing crude oil, polypeptides, oligopeptides, amino acids, and/or green coal from the oilseeds. One method disclosed herein comprises pre-treating whole oilseeds with subcritical water at a pretreatment temperature to remove the impurities and/or contaminants (such as detoxin) from the oilseeds, separating pretreated oilseeds from a pretreated liquid phase, and extracting proteins from the pretreated oilseeds and undergoing protein hydrolysis to produce polypeptides, oligopeptides, amino acids, or combinations thereof from the pretreated oilseeds using an organic solvent to produce a solid phase. The method can further comprise extracting proteins and undergoing protein hydrolysis to produce polypeptides, oligopeptides, amino acids, or combinations thereof from the solid phase using subcritical water at a post-treatment temperature.

In some embodiments, the pretreatment temperature is between about 180° C. and 220° C. and the pretreating occurs for a period of between about 5 minutes and 60 minutes. In some embodiments, the pretreatment pressure is about 150-500 psi.

In some embodiments, the whole oilseeds are one or more of cotton seeds, rapeseeds, mustard seeds, jathopha seeds, sunflower seeds, safflower seeds, tobacco seeds, sesame seeds, soybeans seeds, flaxseeds, canola seeds, and peanuts.

In some embodiments, the organic solvent is selected from n-hexane, ethanol, methanol, chloroform, acetone, dichloromethane, and petroleum ethers.

In some embodiments, the method further comprises extracting polypeptides, oligopeptides, amino acids, or combinations thereof from the solid phase with subcritical water at a post-treatment temperature. In some embodiments, the post-treatment temperature is between about 190° C. and 240° C. and post-treatment occurs for a period of between about 10 minutes and 40 minutes. In some embodiments, the pressure is maintained at 300-900 psi during the subcritical water post-treatment process.

In some embodiments, the method further comprises producing green coal from the solid phase with subcritical water carbonization of the solid phase at a carbonization temperature. In some embodiments, the carbonization temperature is between about 220° C. and 300° C. and the carbonization pressure is between about 900 and 1500 psi, for a time period of about 5 to 60 minutes.

Thus, the method can further comprise separating a solid phase from the crude oil after extraction and producing green coal from the solid phase with subcritical water carbonization of the solid phase at a carbonization temperature.

The methods disclosed provide at least the ability to swell oilseeds and disrupt the cell walls (hulls) without changing the functionality and quality of oil; the process integration of oil seed cleaning, oil extraction, protein hydrolysis, and green coal production to maximize the energy recovery in the form of crude oil, polypeptides, oligopeptides, amino acids, and/or green coal from oilseeds; and heat integration during processing stages including subcritical water pretreatment, oil extraction, and subcritical water carbonization to minimize the process heat requirement.

The integrated processes disclosed provide several major advantages over conventional processes including higher oil yield, shorter extraction time, tolerance to high moisture content of the feedstock, the pretreatment step can help to clean up the feedstocks that eliminate the traditional preparation stages, and utilization of the extracted solid residue for polypeptides, oligopeptides, amino acids, and/or green coal production.

The most energy-intensive and costly stage in the production of fuels from oil-based feedstock is extraction and purification of oils derived from the biomass feedstock. The processes disclosed herein concentrate on extraction and purification of oil from the biomass, and in particular from oilseeds. With the use of the disclosed processes, as much as 85% of the energy content in oilseeds is expected to be recovered in the form of products such as crude oil and green coal. The extracted oils can be readily converted into biodiesel through the well-studied transesterification process or into renewable diesel and advanced biofuels (jet fuel, green diesel) through the catalytic hydrodeoxygenation process, as examples. Valuable byproducts (such as proteins, polypeptides, oligopeptides, and/or amino acids) are also produced which can be used in the cosmetics, animal feed, and/or pharmaceutics industry. The green coal produced from the residue has application as a solid fuel.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures:

FIG. 9A is a graph illustrating the mass distribution of products from oilseeds after the processes disclosed herein;

FIG. 9B is a graph illustrating the energy (ECR) distribution of products from oilseeds after the processes disclosed herein; and FIG. 10 is a flow diagram of the material balance of the processes disclosed herein.

DETAILED DESCRIPTION

Figure 1A:
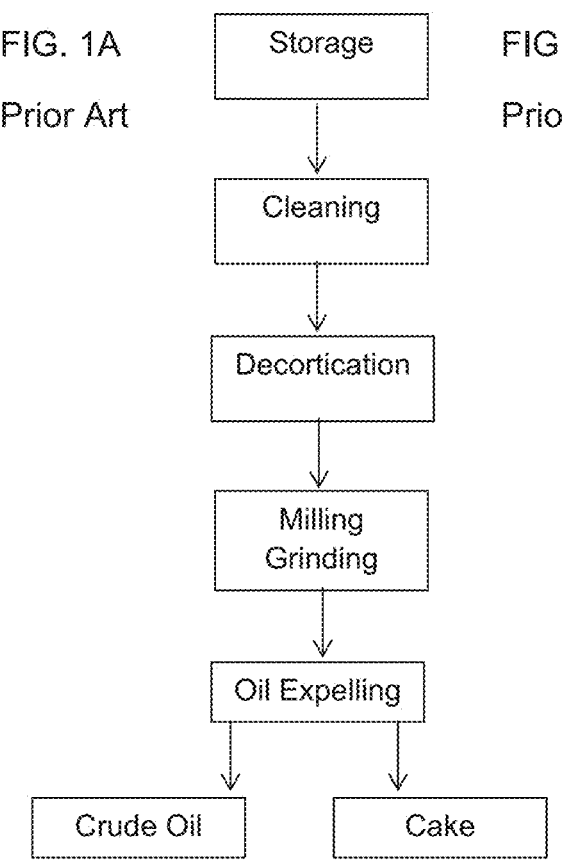
FIG. 1A illustrates major steps involved in conventional oil extraction from oilseeds via pressing.
Figure 1B:
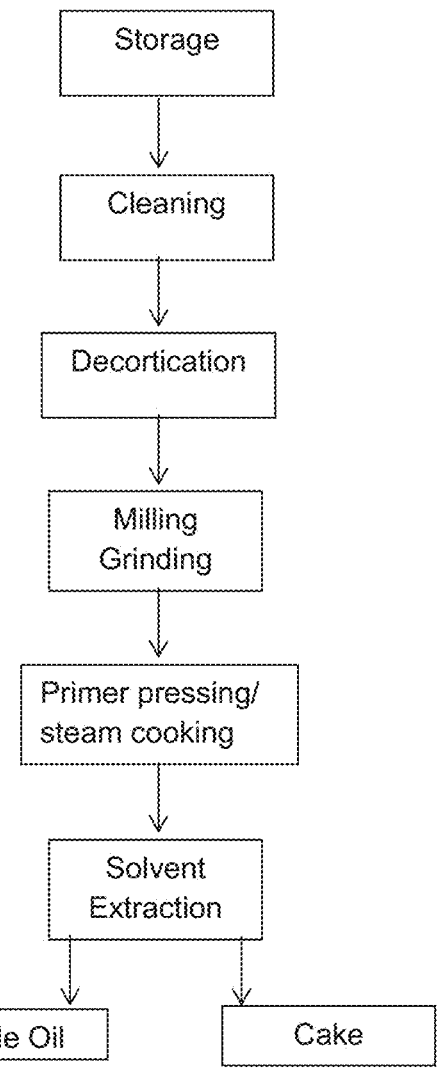
FIG. 1B illustrates major steps involved in conventional oil extraction from oilseeds via solvent extraction.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a solvent" can include a plurality of such solvents, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

The term "subcritical water carbonization" as used herein refers to the wet pyrolysis process, which under pressures and the subcritical water converts organic substances (such as lignocellulosic biomass) to a carbon-rich solid fraction.

The term "green coal" as used herein refers to a carbon-rich solid fraction (such as biochar, biocoal, hydrochar, and the like) that results from hydrolysis, dehydration, decarboxylation, polymerization, and/or aromatic reactions.

The term "amino acid" as used herein refers to naturally occurring and non-natural amino acids, as well as amino acid analogs and amino acid mimetics that function in a manner similar to the naturally occurring amino acids. Naturally encoded amino acids are the 20 common amino acids (alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, and valine) and pyrrolysine and selenocysteine. Amino acid analogs refers to compounds that have the same basic chemical structure as a naturally occurring amino acid, i.e., an a carbon that is bound to a hydrogen, a carboxyl group, an amino group, and an R group, such as, homoserine, norleucine, methionine sulfoxide, methionine methyl sulfonium. Such analogs have modified R groups (such as, norleucine) or modified peptide backbones, but retain the same basic chemical structure as a naturally occurring amino acid.

The term "peptide" as used herein refers to a compound comprising two or more amino acids.

The term "oligopeptide" as used herein refers to a peptide having at least 2 amino acids, and no more than about 10 amino acids.

The term "polypeptide" as used herein refers to any peptide including 10 or more amino acids joined by peptide bonds or modified peptide bonds.

"Protein hydrolysis" as used herein refers to a process by which a protein is hydrolyzed or broken down into smaller peptides or protein fragments typically having a reduced molecular weight than the protein in its original (unhydrolyzed) state. In general, protein can be hydrolyzed using an acid, a base, one or more enzymes, or any combination of any of these.

The term "wet cake" as used herein refers to the solid fraction of solvent extraction of pretreated oilseeds that has been separated from the liquid fraction using press and/or vacuum filtration, as non-limiting examples.

Subcritical water is a non-toxic, environmentally benign, inexpensive, and green solvent which can be used as an alternative to conventional organic solvents generally used in the solvent extraction process, such as n-hexane. Liquid water below the critical point is referred to as subcritical water. In the subcritical region, the ionization constant ($K_w$) of water increases with temperature and is about three orders of magnitude higher than that of ambient water, and the dielectric constant ($\epsilon$) of water drops from 80 to 20. A low $\epsilon$ allows subcritical water to dissolve organic compounds, while a high $K_w$ allows subcritical water to provide an acidic medium for the hydrolysis of biomass components. Because of its tunable solvent properties, subcritical water can be employed to extract many organic components from biomass.

Subcritical water pretreatment, also referred to herein as hydrothermal pretreatment, of the oilseeds increases the accessibility to the oils encased inside the hulls. As non-limiting examples, oilseeds include cotton seeds, rapeseeds, mustard seeds, sunflower seeds, safflower seeds, jathopha seeds, tobacco seeds, sesame soybeans, cotton seeds, flaxseeds, and canola seeds. The subcritical water swells oilseeds to disrupt the seed walls (hulls) without changing the functionality and quality of oil. The subcritical water increases the Brunauer-Emmett-Teller (BET) surface area, the pore volume and the pore diameter. Cell walls, in general, are organized in a conventional framework. The basic framework is highly polymeric. Interspersed within the framework are lower molecular weight polymers, inorganic, and non-monomeric compounds. The solvent properties of subcritical water in the range of 120-220° C. are used for 5 to 60 minutes of pretreatment time to hydrolyze the amorphous or water-soluble components of cell walls and enhance the solvent's accessibility for extracting oils in the subsequent stage. With the removal of amorphous components after subcritical water pre-treatment, surface modifications (e.g. creation of cracks and pores) occur as a result of mild hydrolysis over the cell wall surface.

Figure 2:
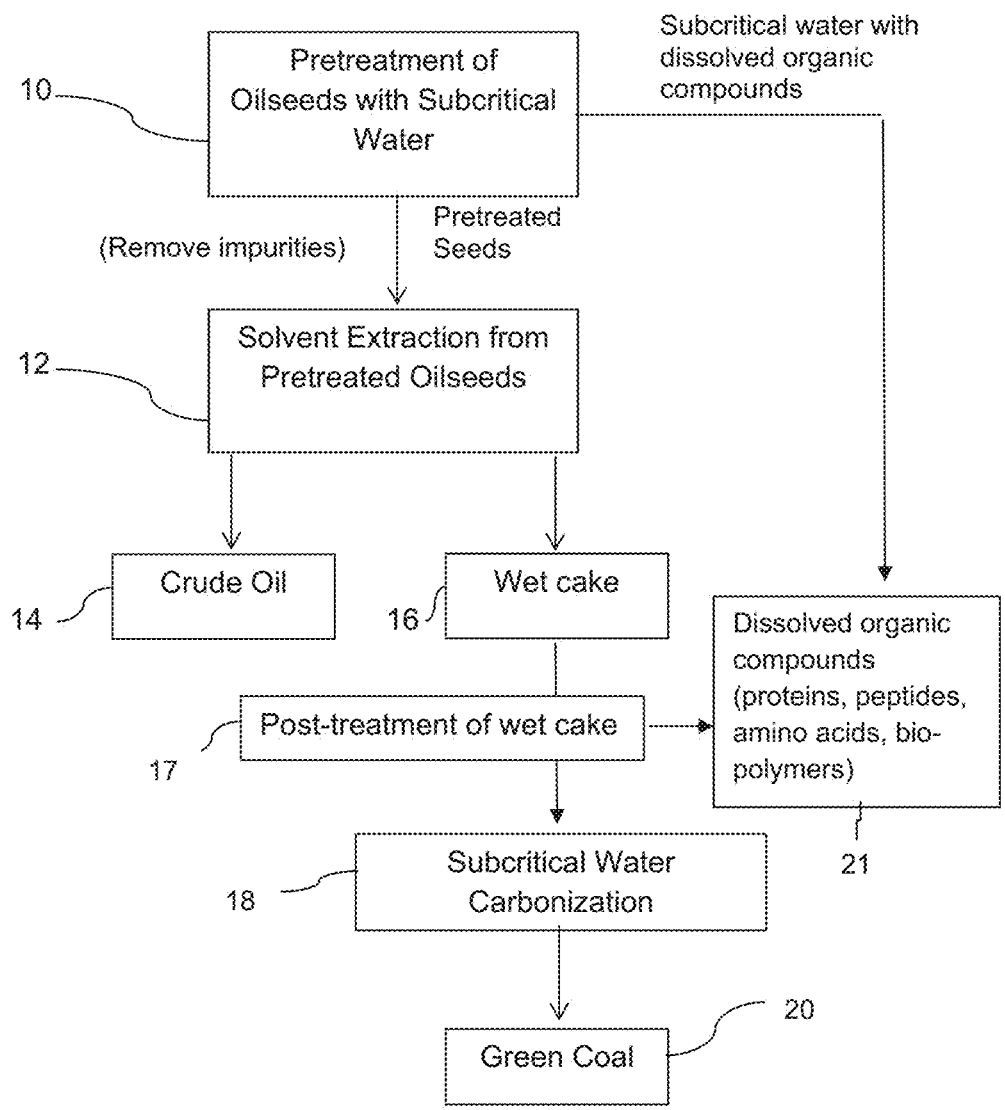
FIG. 2 is a flow diagram of the processes disclosed herein.

FIG. 2 is a flow diagram of a process for producing crude oil, polypeptides/amino acids, and green coal from oilseeds in accordance with some embodiments of the presently disclosed subject matter. As illustrated, in step 10, the oilseeds are subjected to subcritical water pre-treatment. The subcritical water treatment removes or destroys the impurities and/or contaminants, such as pesticides, chemical contamination, bacteria, toxic metabolites, and the mycotoxins produced by mold and fungi (such as, but not limited to, Aflatoxin G1, B1, G2, B2; Vomitoxin, Citrinin; Ochratoxin). The above list is not exhaustive and additional impurities and/or contaminants can be removed or destroyed, as would be appreciated by those of ordinary skill in the art. The impurities are either destroyed during the subcritical water treatment, or are transferred from the oilseeds to the subcritical water and are dissolved in the subcritical water.

The temperature range of 120 to 220° C. for the pretreatment is selected based on the hydrolyzing properties of subcritical water for biopolymers. Above 220° C., subcritical water starts hydrolyzing biomass polymers (cellulose, proteins) to water-soluble compounds that leads to liquefaction of biomass components as well as hydrolysis of oils to fatty acids. In other words, the oilseed cell material (i.e., hulls) would be liquefied as oxygenated hydrocarbons in the aqueous phase during such extraction procedures. Due to the higher liquefaction/extraction temperature used (250-350° C.), the quality of oil is not preserved and part of oil is hydrolyzed to fatty acids. Furthermore, no wet cake is produced.

Because swelling the oilseeds rather than liquefying the oil seeds is desired, the subcritical water pretreatment temperature is at or kept below 220° C. This not only helps in protecting oil quality, but also preserving the oilseed cell materials or hulls which can be used for the green coal production in subcritical water.

Thus, in some embodiments, the pretreatment temperature is between about 120° C. to 220° C. or 180° C. to 220° C., such as at least about (or no more than about) 120, 125, 130, 135, 140, 145, 150, 155, 160, 165, 170, 175, 180, 185, 190, 195, 200, 205, 210, 215, or 220° C. for a period of about 5-60 minutes (i.e., no more/less than about 5, 10, 15, 20, 25, 30, 35, 40, 45, 50, 55, or 60 minutes).

In some embodiments, the subcritical water pretreatment pressure can be between about 150 to 500 psi. Thus, the pressure during pretreatment can be at least about (or no more than about) 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500 psi.

The pretreated oilseeds are then separated from a pretreated liquid phase using machine press, centrifugation, evaporation, and/or vacuum filtration. However, the above list is not exhaustive, and the separation step can include any suitable method known or used in the art.

The oil is extracted from the pretreated seeds using organic solvents in step 12. Organic solvents such as (but not limited to) n-hexane, ethanol, methanol, chloroform, acetone, dichloromethane, and petroleum ethers can be used for the oil extraction from the subcritical water pretreated seeds. Extraction can be performed using a Soxhlet extraction apparatus, as a non-limiting example. The liquid phase and solid phases are separated after extraction, with the liquid phase being crude oil 14 which can be further processed for use as a biofuel. Separation can be achieved using evaporation, centrifugation, and the like.

The solid phase is a wet cake 16. The wet cake can then be subjected to subcritical water post-treatment to extract the remaining proteins, and undergo protein hydrolysis to produce polypeptides, oligopeptides, and amino acids 21. Suitable proteins that can be extracted include (but are not limited to) prolamins, albumins, globulins, and combinations thereof.

As would be appreciated by those of ordinary skill in the art, prolamins are a group of plant storage proteins typically found in the seeds of cereal grains (e.g., wheat, barley, rye, corn, sorghum), characterized by a high glutamine and proline content. Further, albumens are a group of proteins that function as storage proteins in the seeds of some plants. In addition, globulins are a group of proteins typically found in seed plants and cereals that have a variety of functions, including storage.

The proteins can be hydrolyzed to produce any of a wide variety of polypeptides (with high molecular weight, ranging from about 5.5 kilodaltons to 200 kilodaltons), oligopeptides (with low molecular weight, about 1.1 kilodalton or less), and amino acids, such as (but not limited to) alanine, arginine, leucine, serine, tyrosine, and/or valine. It should be appreciated that the above list is not exhaustive, and that additional polypeptides, oligopeptides, and/or amino acids can be produced.

In some embodiments, the subcritical water post-treatment process occurs in the temperature range of about 190° C.-240° C. for a period of about 10 to 40 minutes. Thus, the subcritical water post-treatment process can occur at a temperature of at least about (or no more than about) 190, 195, 200, 205, 210, 215, 220, 225, 230, 235, or 240° C. for a period of no more than about (or no less than about) 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 minutes.

In some embodiments, the subcritical water post-treatment process includes maintaining the pressure at a range of about 300 to 900 psi. Thus, the pressure can be at least about (or no more than about) 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, or 900 psi.

The post-treatment of wet cake 17 is then subjected to subcritical water carbonization, also referred to herein as hydrothermal carbonization, in step 18 to make green coal 20 from the wet cake recovered after the subcritical water post-treatment. The subcritical water carbonization process occurs in the temperature range of 220-300° C. Thus, the carbonization temperature can be at least about (or no more than about) 220, 225, 230, 235, 240, 245, 250, 255, 260, 265, 270, 275, 280, 285, 290, 295, or 300° C.

In some embodiments, the subcritical water carbonization reaction time is between about 5 to 60 minutes. Thus, the reaction time can be at least about (or no more than about) 5, 10, 15, 20, 25, 30, 35, 40, 45, 50, 55, or 60 minutes.

In some embodiments, the subcritical water carbonization pressure is about 900 to 1500 psi. Thus, the pressure can be at least about (or no more than about) 900, 910, 920, 930, 940, 950, 960, 970, 980, 990, 1000, 1010, 1020, 1030, 1040, 1050, 1060, 1070, 1080, 1090, 1100, 1110, 1120, 1130, 1140, 1150, 1160, 1170, 1180, 1190, 1200, 1210, 1220, 1230, 1240, 1250, 1260, 1270, 1280, 1290, 1300, 1310, 1320, 1330, 1340, 1350, 1360, 1370, 1380, 1390, 1400, 1410, 1420, 1430, 1440, 1450, 1460, 1470, 1480, 1490, or 1500 psi.

The subcritical water from the pretreatment step 10 has dissolved organic compounds and can also combine to the subcritical water from post-treatment wet cake 17 to recover the overall dissolved organic compounds in step 21. The subcritical water product and the wet cake can be fed together or separately. The temperature of the subcritical water product assists in reducing costs as the temperature is increased in the subcritical water carbonization step 18. Therefore, the process heat requirements are reduced.

The disclosed processes provide the following:

A comparable oil yield compared to prior art processes;

More efficient removal of the impurities and/or contaminants from seeds compared to prior art methods. Seed preparation stages (cleaning, decortications, and milling/grinding) are eliminated in the disclosed process.

Oilseeds with high moisture content can be directly used without the need for additional drying.

Extracted oil appears transparent and is free from suspended solids when compared to the conventional solvent extraction process.

Lower extraction time is required to obtain comparable oil yield.

Wet cake residue after oil extraction is used for the polypeptides, oligopeptides, amino acids, and is then followed by the green coal production.

Batch, semi-batch, and continuous flow reactors can be used for the pretreatment, post-treatment, and subcritical water carbonization.

Microwave heating can be used during subcritical water pretreatment, post-treatment, and subcritical water carbonization process. Microwave assisted processes will require less than five minutes of processing time.

The integrated approach of oil extraction and production of green coal from oilseeds provides a unique opportunity to maximize the overall energy recovery from oilseeds. To quantify the amount of energy being retained in extracted oil and the green coal with respect to the initial energy input from oilseeds, energy conversion ratio (ECR) is defined as:

$$ECR(\%) = \left(\frac{\text{Weight of oil} * HHV \text{ of oil}}{\text{Weight of oilseeds} * HHV \text{ of oilseeds}}\right) * 100 + \left(\frac{\text{Weight of green coal} * HHV \text{ of green coal}}{\text{Weight of oilseeds} * HHV \text{ of oilseeds}}\right) * 100$$

In subcritical water based processes, water is kept in the liquid phase by applying pressure. Thus latent heat typically required for the phase change of water from liquid to vapor phase (2.26 MJ/kg of water) is not necessary. Because the latent heat is not required, the energy requirement is reduced compared to steam based processes. As an example, 2.869 MJ/kg of energy is required to convert ambient water to steam at 250° C. and 0.1 MPa, whereas only 0.976 MJ/kg (about one third of the energy) is required to convert ambient water to subcritical water at 250° C. and 5 MPa. This also means that the energy contained in the subcritical water is insufficient to vaporize the water on decompression. Further, it is possible to recover much of the heat (more than two thirds of the heat) from subcritical water. Therefore, if 1 kg of water is to be heated to subcritical water condition at 250° C. for the subcritical water carbonization process/oil extraction stage, it will require about 1 MJ/kg of process heat.

Subcritical water pretreatment is an efficient process that allows avoiding grinding and other preparation of seeds to obtain cleaner oil suitable for biodiesel production. Meanwhile, the subcritical water treatment can be very efficient to remove or destroy impurities, such as aflatoxin contamination. Aflotoxins are a family of poisonous and cancer-causing toxins produced by certain fungi (e.g., *Aspergillus flavus* and *Aspergillus parasiticus*) that are found on agricultural crops, such as corn, peanuts, cottonseed, and tree nuts. Higher oil yields were obtained when n-hexane is used as a solvent as compared to ethanol. The solids residue after oil extraction (wet cake) allows producing green coal using the wet cake and liquid generated during subcritical water pretreatment of the oilseeds. Subcritical water carbonization of the wet cake and liquid to produce green coal is an efficient means to utilize the oilseed residue. The heating value of green coal is comparable to that of bituminous grade coal and thus can have potential applications in co-firing or other solid fuels applications.

A study was conducted using different oilseeds. The five types of oilseeds used were: cottonseeds, flaxseeds, yellow mustard seeds, canola (rape) seeds, and tobacco seeds. The cottonseeds were obtained from a local farm in Virginia, the flaxseeds, mustard seeds, and canola seeds were purchased accordingly from Superior Nut Company, Cambridge, Mass., Penzeys Spices, Wauwatosa, Wis., and Seedland, Wellborn, Fla. The tobacco seeds were provided by Tyton BioSciences, Danville, Va. All the seeds were dried overnight in an oven at 65±3° C., packed in plastic bags, and stored in a dark and dry place at room temperature before being used. The moisture content of the seeds, determined with a moisture meter Denver Instrument IR 35 by drying the ground seeds at 105° C. to constant weight, was ≤1%.

Figure 3:
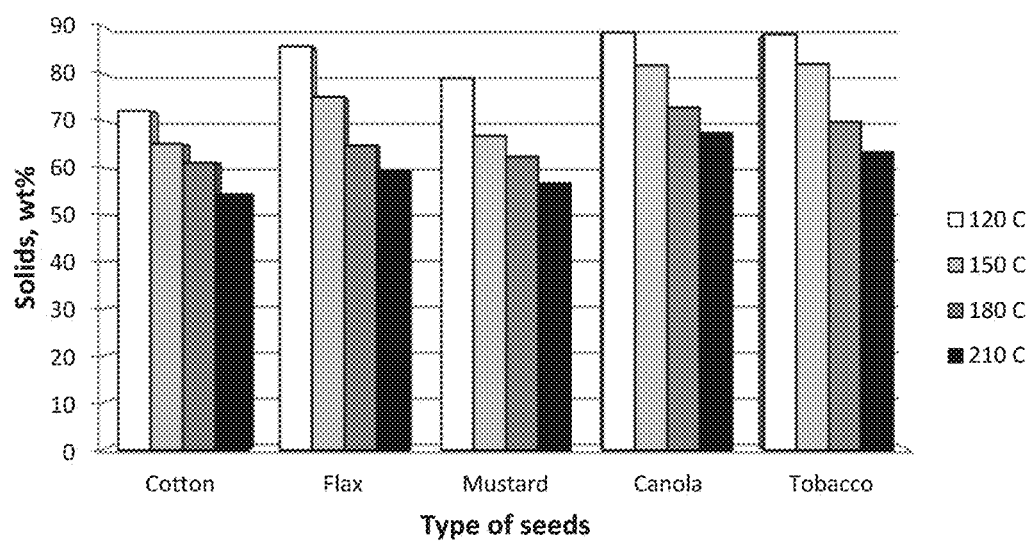
FIG. 3 is a table of different oilseeds and their corresponding weights after subcritical water pretreatment.

Subcritical water pretreatment (or hydrothermal pretreatment) of the seeds was carried out in a 500 mL batch reactor with a Parr 4848 controller at 120±1, 150±1, 180±1, and 210±1° C. (the respective autogenous pressures were 30, 100, 250, and 500±5 psi) for 30 minutes with continuous stirring at 300 RPM. In a typical experiment, the reactor was loaded with 30 grams of the seeds and 300 mL of deionized water, sealed, and kept under the above conditions. After cooling down to the room temperature, the solid and liquid phases were separated by vacuum filtration. The solid phase (pretreated seeds) was dried in an oven at 65±3° C. overnight until the moisture content was below 1%. After the subcritical water pretreatment, the oilseeds became dark but were not crushed and retained the original shapes. The weight of the seeds after the subcritical water pretreatment is provided in FIG. 3.

Figure 4:
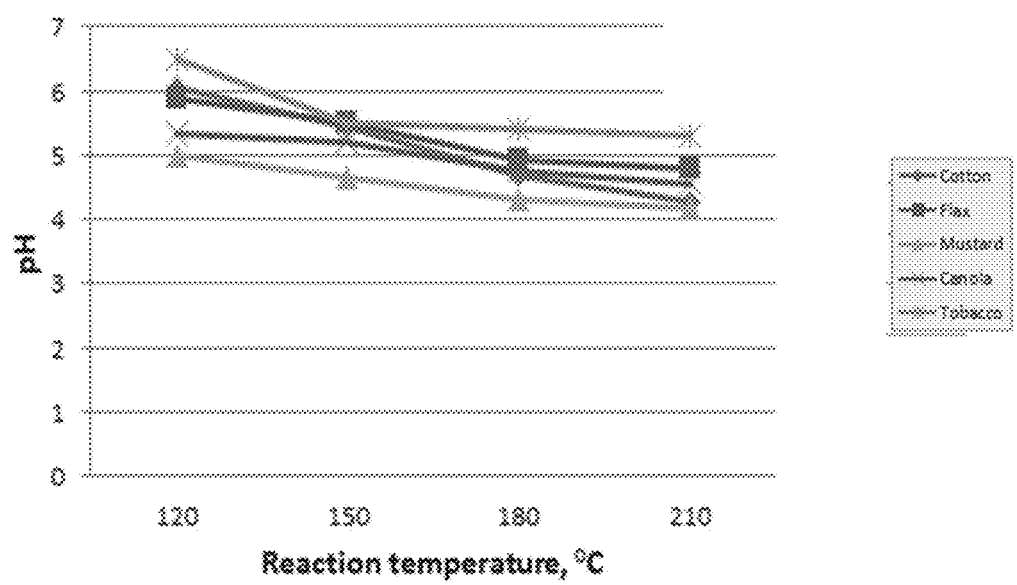
FIG. 4 is a graph showing the pH of the aqueous phase after subcritical water pretreatment.
Figure 5:
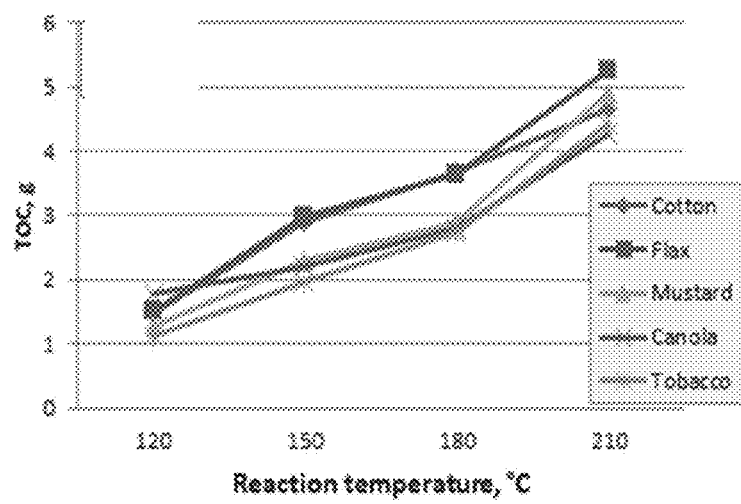
FIG. 5 is a graph showing the total organic carbon of the aqueous phase after subcritical water pretreatment.

The aqueous phase was analyzed for pH and total organic carbon (TOC) with Shimadzu $TOC_{VPN}$ analyzer. The results of the analyses are provided in FIGS. 4 and 5, respectively. The subcritical water pretreatment of the oilseeds promotes hydrolysis of the seed starches and proteins and extraction of them to the aqueous phase. As seen from FIG. 4, pH of the aqueous phase is reducing with increasing reaction temperature, which can be explained by the partial degradation of the hydrolyzed carbohydrates to organic acids. As seen in FIG. 5, TOC is increasing due to intensifying carbohydrate and protein extraction rate. The aqueous phase was collected and stored at 4° C. for using in the subcritical water carbonization of extracted oilseeds experiments.

The next step is Soxhlet extraction of the oilseeds with n-hexane. 10 grams of both ground seeds and seeds pretreated at 120, 150, 180, and 210° C. were extracted with 200 mL of hexane in a Soxhlet apparatus for 120 minutes (8 cycles). After the extraction, hexane was removed by vacuum evaporation to constant weight, and the oil was gravimetrically quantified and labeled. The oil yield (in g/100 g of dry seeds) after each extraction was calculated from the mass of extracted oil and the mass of seeds used for the extraction. The extracted seeds were dried in an oven at 65±3° C. and stored at room temperature for analyses and using in the subcritical water carbonization experiments. The results of the oil extraction from the pretreated and ground seeds are provided in FIG. 6.

Figure 6:
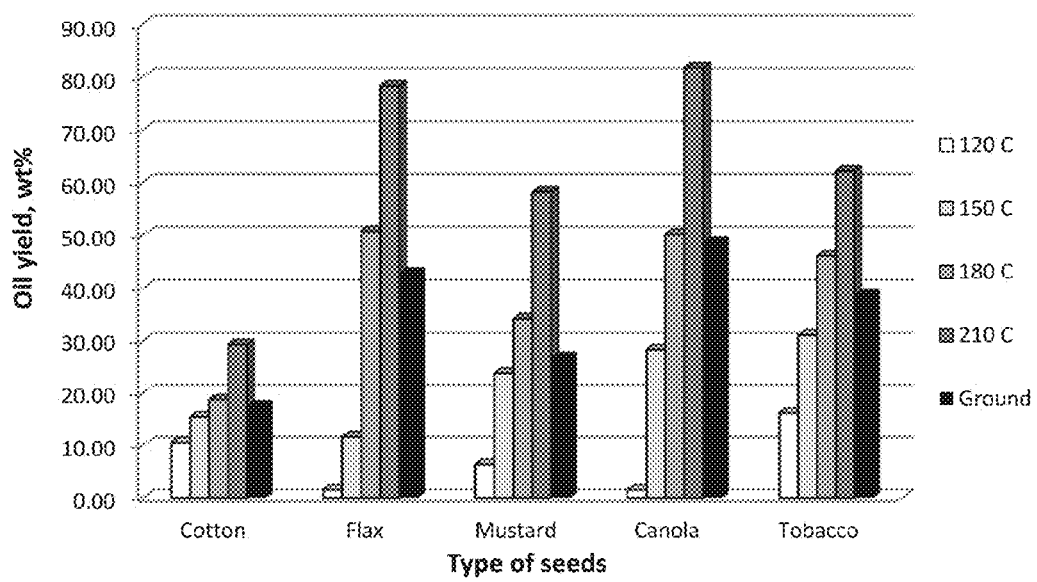
FIG. 6 is a table of the oil yields from both ground seeds and seeds subjected to subcritical water pretreatment.

As can be seen from FIG. 6, the oil yields from all the seeds pretreated at 180 and 210° C. were significantly higher than from the respective ground seeds. The oil yield from the cotton, flax, mustard, canola, and tobacco seeds pretreated at 210° C. was higher than from the respective ground seeds by 11.6%, 35.3%, 31.3%, 32.9%, and 23.2% accordingly and reached as much as 82% for canola seeds. The oils extracted from the seeds pretreated at 180 and 210° C. typically had darker color than the oils extracted from respective ground seeds, which can be explained by the presence of colloid carbon particles as well as free fatty acids (FFAs) as a result of the partial degradation of triacylglycerols at higher temperatures.

Calculations of the oil yields on a raw (unpretreated) seed basis showed that oil yields of most of the seeds pretreated at 210° C. exceeds the oil yield of respective ground seeds by up to 6%. The results of the oil extraction from the pretreated and ground seeds on a raw seed basis are provided in FIG. 7. This phenomenon can be explained by the more porous structure of the pretreated seeds with greater surface area compared to that of the ground seeds, which makes the oils more accessible to solvents such as n-hexane. The partial hydrolysis and removal of the carbohydrates and proteins from the oilseeds to the aqueous phase in the pretreatment step changes the oilseeds structure and increases their porosity and surface area. In order to confirm this, BET surface area and pore size/volume analysis was performed on the extracted oilseeds as described below.

In order to add value to the subcritical water pretreatment and oil extraction process, extracted canola seeds pretreated at 210° C. were subjected to subcritical water carbonization in a 500 mL batch reactor equipped with a Parr 4848 controller. 10 grams of the extracted seeds and 300 mL of the aqueous phase obtained after the seeds' pretreatment were loaded into the reactor, sealed, and kept under the temperature of 300° C. and autogenous pressure of 1220±5 psi for 60 minutes. After the reactor was cooled down to ambient temperature, the solid and liquid phases were separated by vacuum filtration and the solid phase was dried in an oven at 65±3° C. overnight. The dry weight of the carbonized solids (green coal) was 5.5 g (55 wt %).

Elemental analysis of the raw, pretreated, extracted, and carbonized canola seeds was carried out with ThermoFinnigan Flash EA 1112 automatic elemental analyzer and higher heating values of all the samples were calculated using Dulong's formula. The results of the analysis are provided in Table 2.

TABLE 2

| Sample | N, wt % | C, wt % | H, wt % | O, wt % | HHV*, MJ/kg |
|---|---|---|---|---|---|
| Raw canola seeds | 3.227 | 58.39 | 9.293 | 29.09 | 27.837 |
| Pretreated canola seeds | 1.273 | 67.441 | 10.647 | 20.64 | 34.38 |
| Extracted canola seeds | 5.152 | 50.218 | 6.148 | 38.482 | 18.898 |
| Canola seedcake green coal | 4.868 | 64.221 | 6.606 | 24.305 | 26.466 |

*HHV was calculated using Dulong's formula: HHV (MJ/kg) = 33.5 (C %) + 142.3 (H %) − 15.4 (O %) − 14.5 (N %)

As can be seen from the above table, the extracted canola seeds contain a high amount of nitrogen, which indicates a high protein content that can find a proper application. If carbonized with subcritical water, it gives green coal of a good quality (26.5 MJ/kg) comparable with bituminous coal.

Figure 8:
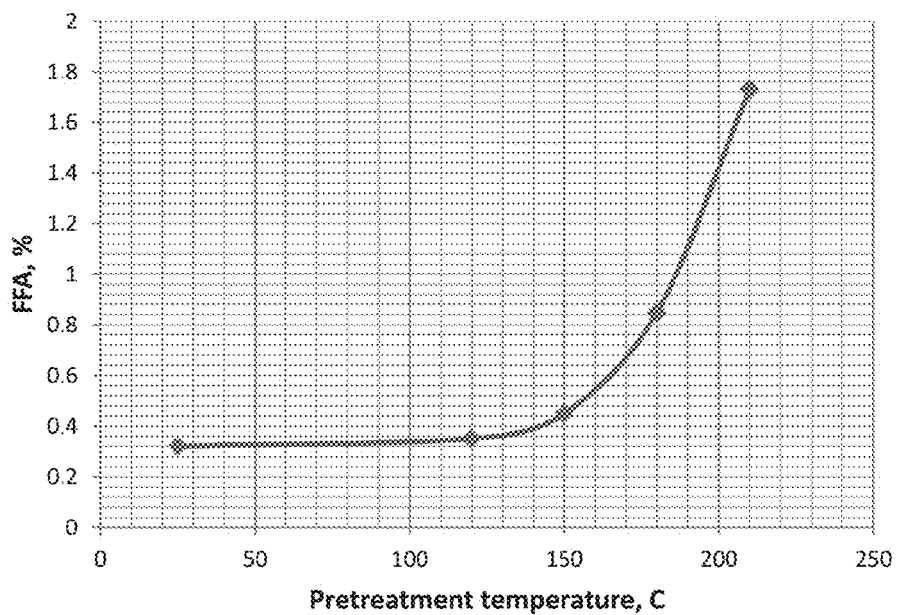
FIG. 8 is a graph of the fatty acid concentrations in the oils extracted from both the ground seeds and the seeds subjected to subcritical water pretreatment.

In order to evaluate the possible degradation of the canola seed oil in a pretreatment step, fatty acid (FFA) concentrations were determined in all the extracted oils. The oils were titrated with 0.1% NaOH solution, and the results obtained are shown in FIG. 8. As seen from FIG. 8, the FFA concentrations are increasing slightly with increasing pretreatment temperature. Therefore, the degradation of the extracted oils at the pretreatment temperatures studied was insignificant.

Additionally, the oils extracted from the raw and pretreated at 210° C. canola seeds were analyzed with SRI-GC8610C chromatograph equipped with Restek MXT-WAX capillary column and a flame ionization detector (FID) to compare their FFA profiles. Helium at 19 psi was used as a carrier gas. The temperature program was as follows: the initial oven temperature 120° C., hold for 3 min, ramp at 20° C./min to 220° C., hold for 10 min; injector temperature 230° C., detector temperature 250° C.

The oil samples were subjected to transesterification with methanol and NaOH (0.35% methoxide). The obtained fatty acid methyl esters (FAMEs) were washed with deionized water, re-dissolved in n-hexane, separated from the water phase, dried over anhydrous $Na_2SO_4$, recovered by vacuum evaporation, and dissolved in chloromethane (1:10). 1 μL of each sample was injected into the column. FAMEs were identified by comparing their retention times and peak areas to those of the standards. The FFA profiles of the both samples were consistent with known canola seed oil profiles. The composition of the oils extracted from the ground seeds and seeds pretreated at 210° C. is shown in Table 3.

TABLE 3

| | Fatty acid composition, wt % | | | | |
|---|---|---|---|---|---|
| Sample | Palmitic (16:0) | Stearic (18:0) | Oleic (18:1) | Linoleic (18:2n6) | Linolenic (18:3n3) |
| Ground seeds | 7.9 ± 0.5 | 2.0 ± 0.5 | 57.2 ± 0.5 | 19.7 ± 0.5 | 13.2 ± 0.5 |
| Pretreated seeds | 7.8 ± 0.5 | 2.0 ± 0.5 | 57.0 ± 0.5 | 20.5 ± 0.5 | 12.7 ± 0.5 |

No significant difference was observed in composition of the oils extracted from the ground seeds and the pretreated canola seeds, indicating no degradation.

BET analysis was carried out with NOVA 2000e surface area and pore size analyzer (Quantachrome Instruments). The ground seeds and seeds pretreated at 210° C. after Soxhlet extraction were used for the analysis. The results shown in Table 4 were obtained:

TABLE 4

| Sample | Surface area, $m^2/g$ (MultiBET) | Pore volume, cc/g (HK method) | Pore diameter, Å (Kr87) |
|---|---|---|---|
| Raw seeds | 1.265 | $7.096 * 10^{-4}$ | 20.745 |
| Pretreated seeds | 5.336 | $88.40 * 10^{-4}$ | 43.998 |

As seen from the table, the surface area, pore volume, and pore size for the hydrothermally pretreated canola seeds were greater than those for the raw seeds. This explains the faster oil extraction and the higher oil yields from the pretreated seeds on a raw seeds basis.

Figure 7:
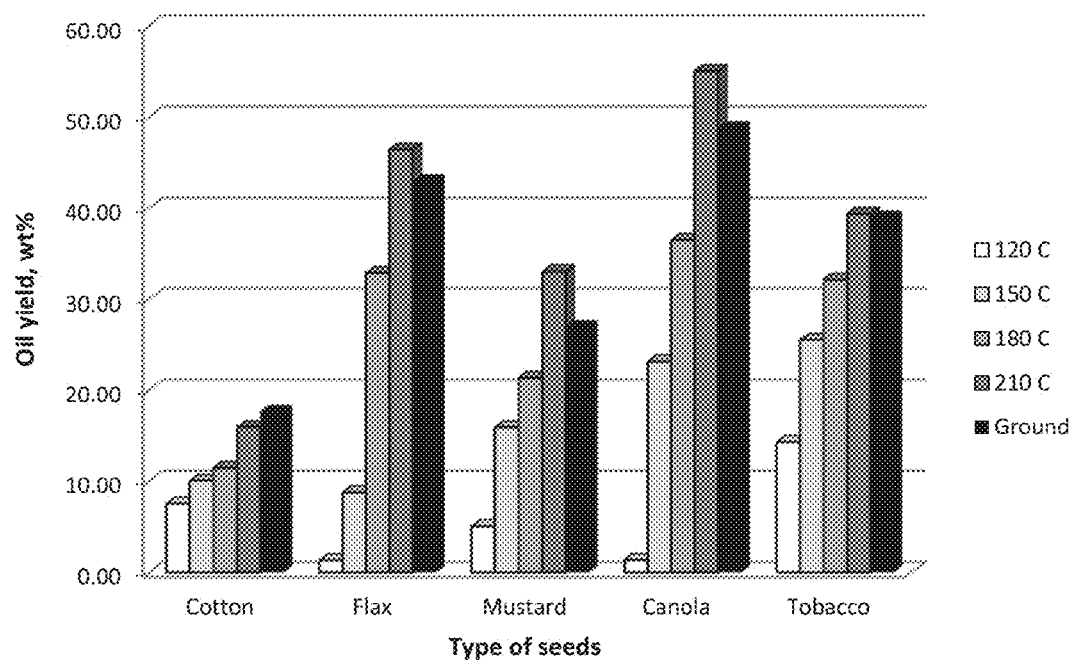
FIG. 7 is a table of the oil yields from both ground seeds and seeds subjected to subcritical water pretreatment on a raw seed basis.

As it can be clearly seen from FIGS. 6 and 7, the subcritical water pretreatment and extraction process for all the oilseeds pretreated at 180 and 210° C. provided significantly higher oil yields than those from the respective ground seeds. The oil yield from the cotton, flax, mustard, canola, and tobacco seeds pretreated at 210° C. was higher than from the respective ground seeds by 11.6%, 35.3%, 31.3%, 32.9%, and 23.2% respectively and reached as much as 82% for canola seeds. Calculations of the oil yields on a raw (unpretreated) seed basis showed that oil yields of the flax, mustard, and canola seeds pretreated at 210° C. exceeded the oil yield of respective ground seeds by 3.43, 6.03, and 6.18% respectively. From BET analysis of the surface area and pore size/volume of the extracted canola seeds (Table 4), it can be seen that all the characteristics for the pretreated seeds were greater than those for the respective ground seeds. The hydrothermal pretreatment makes the oil more accessible for n-hexane and explains the faster oil extraction and higher oil yield from the pretreated seeds on a raw seeds basis without significant degradation of the extracted oil (FIG. 8, Table 3).

Table 5 and FIGS. 9A and 9B provide the mass and energy distribution of all products obtained during the subcritical water pretreatment and extraction of canola seeds at 210° C. Energy conversion ratios (ECRs) were calculated for both oil and green coal using the data from Table 2 and the following formulae:

$$ECR_O = (m_O * HHV_O / (m_S * HHV_S)) 100\% \quad (1)$$

$$ECR_C = (m_C * HHV_C / m_S * HHVs) 100\% \quad (2)$$

Where $m_O$—mass of the oil extracted, g
$HHV_O$—heating value of the oil, MJ/kg
$m_S$—mass of the oilseeds, g
$HHV_S$—heating value of the oilseeds, MJ/kg
$m_C$—mass of the green coal produced, g
$HHV_C$—heating value of the coal, MJ/kg As seen from FIGS. 9A and 9B, the integrated process obtains 55% oil and 25% green coal from the canola seeds, which energy content accounted to 71 and 24% respectively (the overall ECR was 95%).

TABLE 5

| Sample | Mass, g | Mass, wt % | HHV, KJ/g | Energy content, KJ | ECR, % |
|---|---|---|---|---|---|
| Raw seeds | 10.00 | 100.00 | 27.80 | 278.00 | 100.00 |
| Oil | 5.50 | 55.00 | 36.00 | 198.00 | 71.22 |
| Green coal | 2.48 | 24.80 | 26.50 | 65.72 | 23.64 |
| Soluble organics | 2.02 | 20.20 | 7.07 | 14.28 | 5.14 |

To determine the process yields, mass balance around subcritical water pretreatment of the canola seeds, solvent oil extraction, and subcritical water carbonization of the seedcake was developed and summarized in FIG. 10. The raw canola seeds (100 kg, on a dry basis) were subjected to the hydrothermal pretreatment at 210° C. for 30 minutes yielding 63.7 kg of partially hydrolyzed seeds and 32.7 kg of water-soluble organic products. The pretreated seeds were extracted with n-hexane for 90 minutes yielding 55.0 kg of oil and 12.3 kg of extracted seedcake. The latter was mixed with the water-soluble organic products from the pretreatment step, subjected to the subcritical water carbonization at 300° C. for 60 minutes, and resulted in producing 24.8 kg of green coal and 20.2 kg of water-soluble organics, which was further recycled for the next subcritical water carbonization step. The integrated process produces 55% high quality oil, which can be used for biodiesel production, and 25% green coal, thus utilizing 80% of the canola seeds with an overall ECR of 95%.

The subcritical water pretreatment and extraction is a novel integrated process that employs hydrothermal pretreatment and oil extraction steps followed by hydrothermal carbonization of the extracted seeds. The integrated process provides several major advantages over conventional processes: higher oil yield, shorter extraction time, tolerance to high moisture content of the feedstock, avoiding preparation stages, and utilization of the extracted solid residue for green coal production. The disclosed process can be integrated with biodiesel productions. The integration of oil extraction with green coal production adds value to the extracted oil and increases the overall ECR of the oilseeds up to 95%. Hydrothermal pretreatment of oilseeds is an efficient step that makes it possible to significantly increase the oil yield during the following solvent extraction step. The higher oil yield obtained from hydrothermally pretreated seeds and faster oil extraction compared to that of ground seeds can be explained by the partial hydrolysis of carbohydrates and proteins, thus making the solid phase richer in oils and increasing its surface area and pore size/volume. The disclosed integrated process can be an efficient way of simultaneous oil extraction and solid fuels production from different oilseeds.

While described in connection with what is presently considered to be the most practical and preferred embodiment, it is to be understood that the presently disclosed subject matter is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Prophetic Example 1

Effect of Subcritical Water Pretreatment on the Destruction of Aflatoxin

Aflatoxins are resistant to higher temperatures (up to 260° C.), such that cooking and overheating treated foods for extended periods of time would destruct essential vitamins and amino acids. However, by using the subcritical water pretreatment (high temperature and high pressure conditions) and its tunable solvent properties, the process can be efficiently employed to destroy and/or remove aflatoxins from oilseeds, feedstocks, and the like.

The % aflatoxin destruction will be measured after subcritical water pretreatment at various conditions to determine the effect of the pretreatment on impurities and/or contaminants. The subcritical water pretreatment conditions are set forth below in Table 7.

TABLE 7

Effect of Subcritical Water Pretreatment on Aflatoxin Destruction (Aflatoxin G1 for a test example)

| Treatment Time (min) | Temperature (° C.) | Pressure (psi) | Aflatoxin Destruction (%) |
|---|---|---|---|
| 10 | 180 | 800 | TBD* |
| 10 | 210 | 800 | TBD |
| 15 | 180 | 800 | TBD |
| 15 | 210 | 800 | TBD |
| 30 | 180 | 800 | TBD |
| 30 | 210 | 800 | TBD |

*TBD = To be determined

TABLE 8

Oilseed Chemical Compositions

| Seed Type | Crude Lipid (%) | Crude Protein (%) | Crude Fiber (%) | Carbohydrate (%) | Ash (%) |
|---|---|---|---|---|---|
| Flaxseeds | 43.9 | 21.3 | 6.2 | NA | 2.7 |
| Peanut seeds | 47.6 | 28.4 | NA | 21.4 | 2.5 |
| Tobacco seeds | 37.7 | 21.9 | NA | 16.1 | 3.8 |
| Rapeseeds | 43.2 | 18.1 | NA | NA | 5.0 |
| Soybean | 18.0 | 38.0 | 15.0 | 15.0 | 14.0* |

*includes ash, moisture, other

Prophetic Example 2

Oilseed Polypeptide Isolate Following Subcritical Water Hydrolysis

From the information provided in Table 8, the oilseed crude protein ratio can range from 18% to 38%. For adding valuable byproducts into the process, a subcritical water post-treatment step can be applied to effectively hydrolyze de-oiled seeds (wet cake 16 in FIG. 2) for protein extraction and/or protein hydrolysis, then to produce useful polypeptides, oligopeptides, and/or amino acids without the need for enzymatic extraction methods. The produced polypeptides, oligopeptides, and amino acids in the subcritical water can be concentrated for further applications, such as inclusion as ingredients in functional foods.

The degree of protein hydrolysis will be measured after subcritical water post-treatment at various conditions to determine the effect of the pretreatment on impurities and/or contaminants. The subcritical water post-treatment conditions are set forth below in Table 9.

TABLE 9

Effect of the Extraction of Protein, Peptides, Amino Acids from De-Oiled Seeds by Subcritical Water Hydrolysis (Peanut protein isolate as an example)

| Treatment Time (min) | Temperature (° C.) | Pressure (psi) | Degree of Protein Hydrolyis (DPH)* (%) |
|---|---|---|---|
| 5 | 190 | 800 | TBD** |
| 5 | 230 | 800 | TBD |
| 10 | 190 | 800 | TBD |

TABLE 9-continued

Effect of the Extraction of Protein, Peptides, Amino Acids
from De-Oiled Seeds by Subcritical Water Hydrolysis
(Peanut protein isolate as an example)

| Treatment Time (min) | Temperature (° C.) | Pressure (psi) | Degree of Protein Hydrolyis (DPH)* (%) |
|---|---|---|---|
| 10 | 230 | 800 | TBD |
| 15 | 190 | 800 | TBD |
| 15 | 230 | 800 | TBD |

*DPH will be indicated by Tris/Tricine peptide gel electrophoresis of hydrolyzed samples obtained during subcritical water post-treatment conditions.
**TBD = To be determined.

What is claimed is:

1. A method of recovering polypeptides, oligopeptides, amino acids, or combinations thereof from an oilseed, the method comprising:
    pretreating whole oilseeds with subcritical water at a pretreatment temperature to remove impurities, contaminants, or both;
    separating pretreated oilseeds from a pretreated liquid phase; and
    extracting proteins and undergoing protein hydrolysis to produce polypeptides, oligopeptides, amino acids, or combinations thereof from the pretreated oilseeds using an organic solvent to produce a solid phase;
    extracting proteins and undergoing protein hydrolysis to produce polypeptides, oligopeptides, amino acids, or combinations thereof from the solid phase using subcritical water at a post-treatment temperature.

2. The method of claim 1, wherein the pretreatment temperature is between about 180° C. and 220° C.

3. The method of claim 1, wherein pretreating occurs for a period between 5 minutes and 60 minutes.

4. The method of claim 1, wherein the pretreating occurs at a pressure of between about 150 and 500 psi.

5. The method of claim 1, wherein the separation comprises the use of machine press, centrifugation, evaporation, vacuum filtration, or combinations thereof.

6. The method of claim 1, wherein the whole oilseeds are one or more of cotton seeds, rapeseeds, mustard seeds, jathopha seeds, sunflower seeds, safflower seeds, tobacco seeds, sesame seeds, soybeans seeds, flaxseeds, peanuts, and canola seeds.

7. The method of claim 1, wherein the proteins are selected from albumins, globulins, prolamins, and combinations thereof.

8. The method of claim 1, wherein the organic solvent is selected from n-hexane, ethanol, methanol, chloroform, acetone, dichloromethane, and petroleum ethers.

9. The method of claim 1, further comprising extracting polypeptides, oligopeptides, amino acids, or combinations thereof from the solid phase with subcritical water at a post-treatment temperature.

10. The method of claim 9, wherein the post-treatment temperature is between about 190° C. and 240° C.

11. The method of claim 9, wherein post-treatment occurs for a period of between about 10 minutes and 40 minutes.

12. The method of claim 9, wherein the post-treatment pressure is between about 300 and 900 psi.

13. The method of claim 9, further comprising producing green coal from the solid phase with subcritical water carbonization of the solid phase at a carbonization temperature.

14. The method of claim 13, wherein the whole oilseeds are one or more of cotton seeds, rapeseeds, mustard seeds, jathopha seeds, sunflower seeds, safflower seeds, tobacco seeds, sesame seeds, flaxseeds, peanuts, and canola seeds.

15. The method of claim 13, wherein the carbonization temperature is between about 220° C. and 300° C.

16. The method of claim 13, wherein the carbonation pressure is between about 900 and 1500 psi.

17. The method of claim 13, wherein the carbonization reaction time is between about 5 and 60 minutes.

\* \* \* \* \*